(12) United States Patent
Krieger (10) Patent No.: US 7,325,570 B1
(45) Date of Patent: Feb. 5, 2008

(54) METHOD AND APPARATUS FOR NOISE SUPPRESSION IN A FLUID LINE

(75) Inventor: Clifford P. Krieger, Dryden, MI (US)

(73) Assignee: Coupled Products, LLC, Rochester Hills, MI (US)

( * ) Notice: Subject to any disclaimer, the term of this patent is extended or adjusted under 35 U.S.C. 154(b) by 222 days.

(21) Appl. No.: 11/006,200

(22) Filed: Dec. 6, 2004

(51) Int. Cl.
*F16L 55/04* (2006.01)

(52) U.S. Cl. .............................. 138/26; 138/42; 138/44; 181/232

(58) Field of Classification Search ................... 138/30, 138/26, 40, 42, 44; 181/222, 232, 238, 256, 181/257, 275, 281
See application file for complete search history.

(56) References Cited

U.S. PATENT DOCUMENTS

| | | | |
|---|---|---|---|
| 2,943,641 | A | 7/1960 | Arnold |
| 3,323,305 | A | 6/1967 | Klees |
| 4,116,303 | A | 9/1978 | Trudell |
| 4,203,287 | A | 5/1980 | Bennett |
| 4,611,633 | A | 9/1986 | Buchholz et al. |
| 5,094,271 | A | 3/1992 | Fritz et al. |
| 5,172,729 | A | 12/1992 | Vantellini |
| 5,201,343 | A | 4/1993 | Zimmermann et al. |
| 5,495,711 | A * | 3/1996 | Kalkman et al. ............. 60/469 |
| 5,513,675 | A | 5/1996 | Toyama et al. |
| 5,539,164 | A * | 7/1996 | van Ruiten .................. 181/233 |
| 5,641,120 | A | 6/1997 | Kuykendal et al. |
| 5,697,216 | A | 12/1997 | Phillips |
| 5,728,981 | A * | 3/1998 | van Ruiten .................. 181/233 |
| 5,791,141 | A * | 8/1998 | Phillips ........................ 60/327 |
| 5,941,283 | A | 8/1999 | Forte |
| 6,073,656 | A | 6/2000 | Chen et al. |
| 6,123,108 | A | 9/2000 | Chen et al. |
| 6,125,890 | A * | 10/2000 | Cooper et al. .............. 138/131 |
| 6,155,378 | A | 12/2000 | Qatu et al. |
| 6,158,472 | A * | 12/2000 | Hilgert ........................ 138/26 |
| 6,269,841 | B1 | 8/2001 | Chen et al. |
| 6,338,363 | B1 * | 1/2002 | Chen et al. .................... 138/26 |
| 6,360,777 | B1 * | 3/2002 | Bae ............................... 138/30 |
| 6,688,423 | B1 * | 2/2004 | Beatty et al. ................ 181/207 |
| 7,007,718 | B2 * | 3/2006 | Chen et al. .................... 138/26 |

(Continued)

*Primary Examiner*—James Hook
(74) *Attorney, Agent, or Firm*—Reising, Ethington, Barnes, Kisselle, P.C.

(57) ABSTRACT

An energy attenuation method and apparatus for a system conveying liquid under pressure. The apparatus is disposed in a liquid conveying structure of the system and includes first and second outer hose conduits, each of which respectively defines an associated first and second tuning chamber each having an inlet end and an outlet end. A tubular conduit interconnects the two hose conduits such that the chambers communicate with one another via the tubular conduit. A first tuning tube of polymeric material is disposed in the first chamber and has a first end connected to the inlet end of the first chamber for receiving liquid therein and has a second open end that is spaced from the outlet end of the first chamber for emptying liquid into the first chamber. A second tuning tube of polymeric material is mounted in the second chamber and has a first end connected to the outlet of the second chamber for conveying liquid thereto and a second open end that is spaced from the inlet end of the second chamber for receiving liquid conveyed to the second chamber via the tubing conduit. Seven additional alternative embodiments of fluid noise attenuation systems are also disclosed.

20 Claims, 7 Drawing Sheets

U.S. PATENT DOCUMENTS 7,036,530 B2 * 5/2006 Chen et al. .................. 138/30
2002/0100515 A1 * 8/2002 Chen et al. .................. 138/30
2004/0250865 A1 * 12/2004 Davis ......................... 138/26

* cited by examiner

METHOD AND APPARATUS FOR NOISE SUPPRESSION IN A FLUID LINE

The present invention relates to suppression of fluid-borne noise in hydraulic or fluid handling systems, such as automotive power steering, power brake, air conditioning and fuel distribution systems.

BACKGROUND OF THE INVENTION

There are many applications in industry and commerce where it is desirable, and in some cases required, to suppress fluid-borne noise in hydraulic power systems and other fluid handling systems. As an example, it is desirable to attenuate or suppress fluid-borne noise generated by the pump or fluid valving in power steering, power brake, fuel distribution and air conditioning systems.

The inherent design of fluid pumps, whether driven by an internal combustion engine, an electric motor or by fluid system valves, causes pressure fluctuations or pulses in the fluid line which generate fluid-borne noise. The pistons, rotors, gears, vanes or other fluid displacement elements that pump the fluid cause pressure fluctuations, ripple, or pulses within the fluid at a frequency that is dependent upon pump speed. The geometry and inherent characteristic of the pump can also be sources of fluid pressure fluctuations and vibrations. This fluid ripple can be a source of audible and objectionable noise and can also excite components along its path (e.g., the steering gear in power steering) to cause them to become secondary generators of such noise.

During normal operation of an automotive power steering system, for example, hydraulic fluid pressure can repetitively vary and thereby generate a pressure dependent wave form that can range substantially in magnitude or amplitude between the upper and lower limit values and induce system vibration. The frequency of such fluid-borne vibration also can vary substantially with the speed of the driving component (e.g., engine) and other factors. Therefore expansible-type hoses are often used as the fluid conductors in fluid systems in order to dampen and absorb such fluid-borne vibrations. These hoses typically consist of a tube of rubber or another elastomeric material which is reinforced by nylon or a similar material. The braiding or other reinforced member may be disposed within the outer circumference of the tubing, or may be disposed within a layer of elastomeric material that is itself disposed around the outside of the tubing. The soft, compressible, elastic material of expansible hose expands upon pressure to absorb pressure fluctuations in the fluid. The strengthening braid also allows some degree of expansion when subjected to pressure.

Expansible hoses are wide-band devices and, in principle, can respond to fluid vibrations over a wide frequency range. For satisfactory performance, there must be enough expansion capability in the elastomeric hose material to absorb the pressure fluctuations over the amplitude and frequency range encountered in the fluid system. However, this is possible only when the changes in volume flow rate associated with the pressure ripples are less than the volume expansion capability of the hose for the same change in hydraulic fluid pressure.

In order to dampen the fluctuation even further, an attenuator in the form of a tuner conduit made of spirally constructed steel or smooth wall polymeric material, such as Teflon or nylon, also has been used within the hose. This tuner usually permits the fluid to flow, via clearances between the spiral tube or apertures in the tube, from within its bore into the annulus or chamber formed between the tuner O.D. and the hose I.D. or bore. The fluid flowing in this annulus meets the fluid which is flowing inside the tuner bore at the downstream end of the tuner length and results in some reduction of the pressure pulsation and resultant noise and/or vibration.

BRIEF DESCRIPTION OF THE DRAWINGS

The invention, together with additional features and advantages thereof will be best understood from the following detailed description, appended claims and the accompanying drawings wherein:

DETAILED DESCRIPTION OF PREFERRED EMBODIMENTS

First Embodiment

Figure 1:
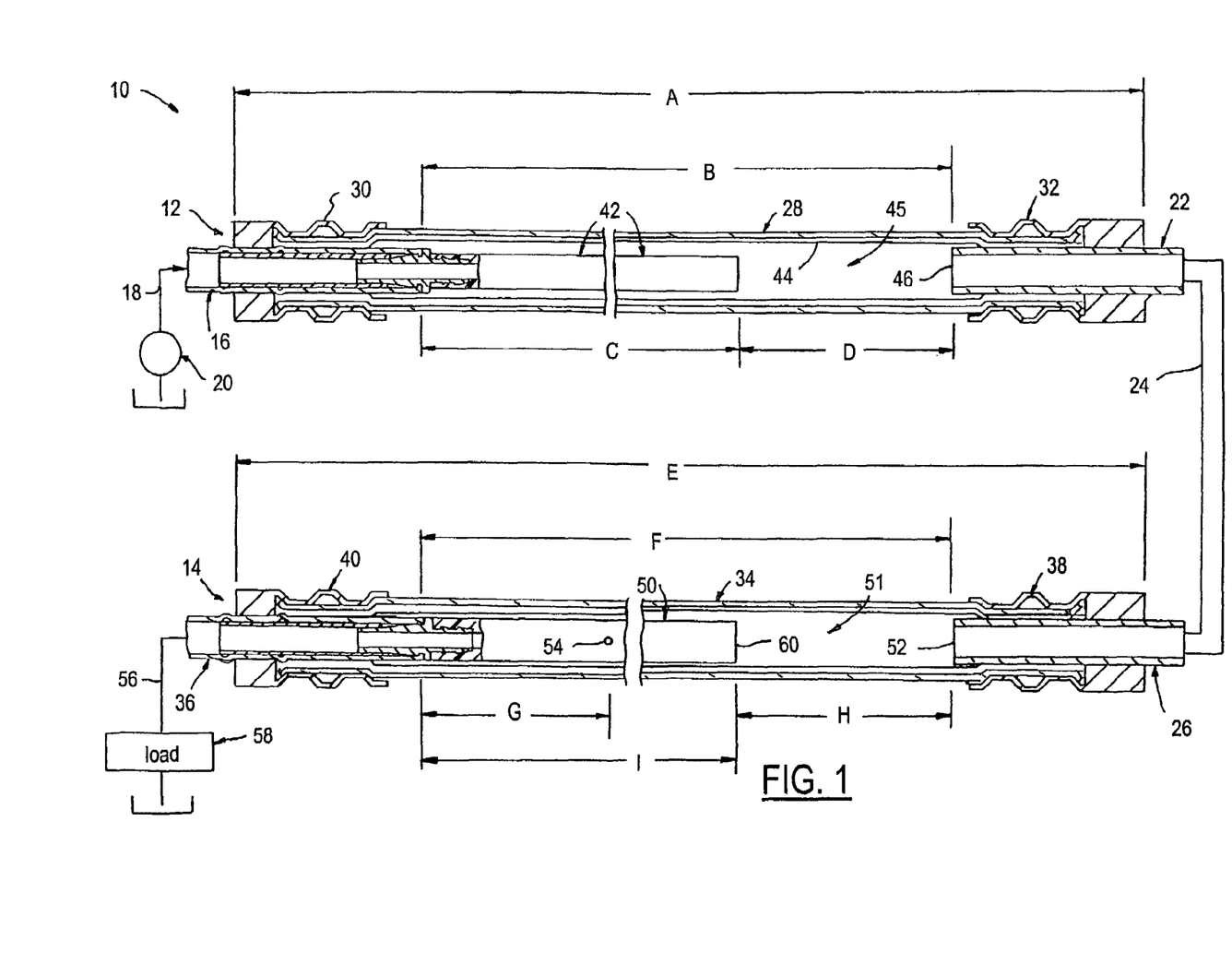
FIG. 1 is a partially schematic and fragmentary view, and partially in longitudinal center section illustrating a representative fluid handling system equipped with an improved dual chamber pressure ripple attenuator conduit system for suppression of fluid-borne noise in accordance with one exemplary but preferred first embodiment of the invention applied to a power steering system.

The fluid handling system illustrated in FIG. 1 of the drawings is in the form of a hydraulically actuated power steering system 10 for a vehicle that incorporates a pair of serially coupled attenuator conduits in the form of fluid tuning chamber conduits 12 and 14. The first chamber conduit 12 has an inlet fitting 16 (as described in more detail hereinafter with reference also to FIGS. 2-4) suitably connected to the outlet end of a high-pressure metal conduit line 18 leading from a system power steering pump 20. First chamber conduit 12 has an outlet fitting 22 connected by a separate tubular metal conduit 24 to an inlet fitting 26 of second chamber conduit 14. It is to be understood that system 10 does not employ a restrictor as such or the equivalent thereof, inasmuch as a "restrictor" is a term used to refer to a device for separating a noise attenuating chamber or tube into two parts, and does not refer to a conduit for connecting two tuning chambers to each other, such as conduit 24.

Both chamber conduits 12 and 14 are enveloped by a conventional volumetrically compliant elastomeric hose, the axially opposite open ends of a hose 28 of first chamber conduit 12 being respectively connected to associated inlet and outlet fittings 16 and 22 by conventional crimp collar shell fittings 30 and 32 respectively. Elastomeric hose 34 of second chamber conduit 14 is similarly connected at its axially opposite open ends to associated inlet and outlet fittings 26 and 36, again hose 34 being coupled to these fittings by conventional crimp collar shell fittings 38 and 40 respectively.

First chamber conduit 12 has a hollow polymeric tuning tube 42 extending from inlet fitting 16 into the first tuning chamber 45 defined by the interior wall surface 44 of hose 28, but has an open outlet end 43 that stops well short of the open entrance end 46 of outlet fitting 22. Tuning tube 42 preferably has a right circular cylindrical constant diameter cross section and is made of Teflon material. It is to be noted that there are no bleed holes or other sidewall apertures in tuning tube 42. It has been found that tuning tube 42 in first chamber 45 made of such polymeric material and without bleed holes provides optimum 1/4 wave side branch attenuation of pressure ripple.

The absence of bleed holes and the like in tube 42 also contributes to economy of manufacture and assembly.

Second chamber conduit 14 also has a polymeric tuning tube 50, but, in accordance with a principal feature of the present invention, tube 50 extends from outlet fitting 36 into the tuning chamber 51 defined by hose 34, and also stops well short of the open exit end 52 of inlet fitting 26 of chamber conduit 14. A pair of bleed openings extend radially through the wall of tuning tube 50, only one of such holes 54 being shown in FIG. 1, its companion hole (not shown) being located diametrically opposite hole 54, if desired, or longitudinally staggered relative thereto.

Outlet fitting 36 of the second chamber 14 is suitably coupled to the high-pressure tubular conduit line 56 leading to a system load 58 and which, in the preferred embodiment, is a power steering gear.

Figure 2:
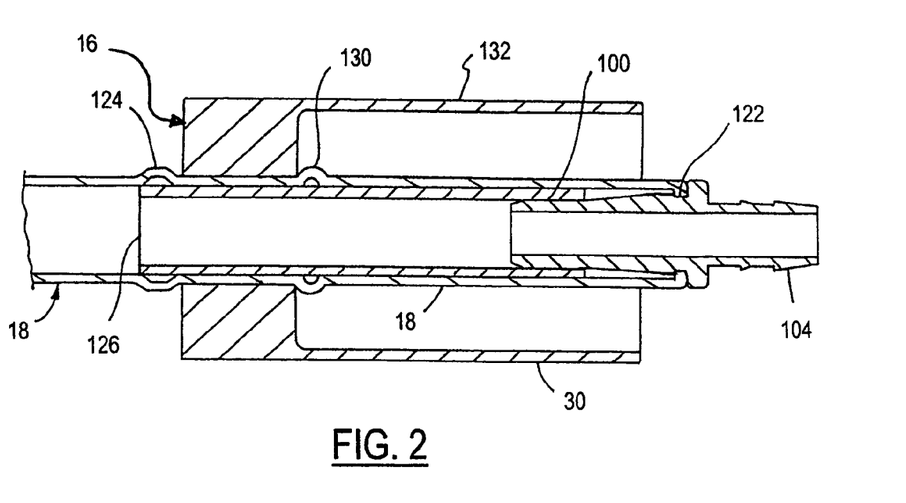
FIG. 2 is a fragmentary longitudinal center section view of the inlet fitting subassembly of the first, upstream fluid tuning chamber of the FIG. 1 system prior to crimping of the collar of this fitting subassembly.
Figure 3:
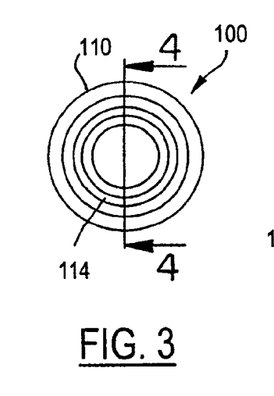
FIG. 3 is an end view of an adapter shown by itself in FIG. 4 and used in the inlet fitting subassembly of FIG. 2.
Figure 4:
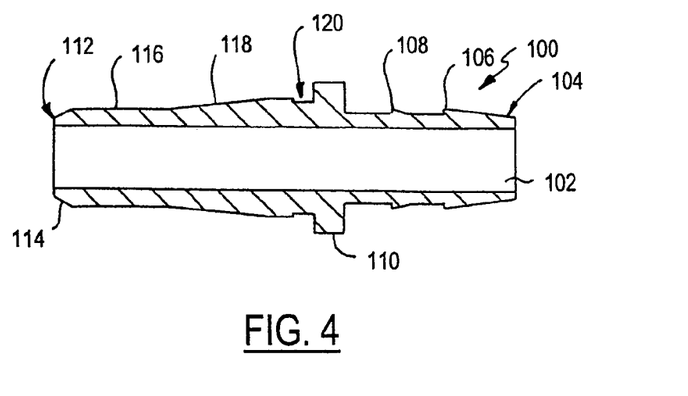
FIG. 4 is a longitudinal center section taken on the line 4-4 of FIG. 3.

Although the inlet and outlet fittings 16 and 36 in which the tuning tubes 42 and 50 are respectively secured may be of various forms of conventional constructions, it is presently preferred to employ the improved fitting 16 constructed as shown in more detail in FIGS. 2, 3 and 4. FIG. 2 illustrates fitting 16 as a completed subassembly but for the crimping of collar 30. As best seen in FIGS. 3 and 4, an improved form of adapter 100 is provided as a generally tubular piece having a through bore 102 and a nipple end 104 provided with annular barbs 106 and 108 having preferably a 7° and 15° taper respectively. Nipple 104 terminates at its inner end at a radially enlarged flange 110 and is adapted to telescopically receive the open upstream end of tuner tube 42 with a slight interference fit over the barbs 106 and 108, with the end of the tube abutting flange 110 in assembly. Adapter 100 has a nose portion 112 extending from flange 110 to the upstream open end of the adapter that is provided with a beveled leading edge 114. Nose 112 has a constant diameter cylindrical portion 116 that in turn leads into a 5° tapered portion 118 that terminates just short of flange 110 and is spaced therefrom by an annular external groove 120.

Tube 18 is preformed to the extent of forming an inturned lip 122 at its open end and forming an annular bead stop 124 positioned to serve as a locating abutment for installing collar 30. A steel reinforcing sleeve 126 is inserted with a slight press fit into tube 18 so as to be located as shown in FIG. 2 relative to collar 30 in assembly. The end of sleeve 126 closest to tube lip 122 is dimensioned to slidably telescope onto nose portion 116 of adapter 100 with a press fit.

After collar 30 is telescoped onto tube 18 so as to abut stop bead 124, another stop bead 130 is formed in tube 18 as shown in FIG. 2 to capture the collar 30 in assembly on tube 18. Adapter 100 is then telescopically inserted into the downstream end of tube 18. As nose portion 112 of adapter 100 engages the tube bead 122 and then is progressively telescoped in tube 18, the tapered portion 118 of adapter 100 causes bead 122 to expand slightly until the bead and adapter groove 120 are in registry, whereupon bead 122 snaps into groove 120 to lock adapter 100 in assembly in the downstream end of tube 18. Concurrently nose portion 116 of adapter 100 telescopically enters into the downstream end of reinforcing sleeve 126 with a press fit.

The upstream end of tuning tube 42 is then inserted with a telescopic press fit onto nipple 104 of adapter 100. To complete the assembly of fitting 16 in forming chamber conduit 12, the end of hose 28 is inserted into the undeformed collar 30 in the annular space between tube 18 and the shell 132 of collar 30. Collar sleeve 130 is then crimped to the form generally indicated in FIG. 1 to complete the coupling of tube 18 with chamber conduit 12, as indicated semi-schematically in FIG. 1.

Fittings 22 and 26 of tuning conduits 12 and 14 are of conventional crimp collar construction with associated steel reinforcing sleeves.

Outlet fitting 36 of the downstream second chamber conduit 14 is constructed in an identical manner to inlet fitting 16 described hereinabove, and tuning tube 50 is coupled to outlet tube 56 in like manner using another adapter 100.

In one successful working first embodiment of the invention for automotive power steering applications, the following exemplary dimensional and material parameters were utilized:

|  | Metric | Inches |
| --- | --- | --- |
| First Chamber Conduit 12: | | |
| Dimension A | 425 mm | 16.73 in |
| Dimension B | 336 mm | 13.23 in |
| Dimension C | 298 mm | 11.73 in |
| Dimension D | 38 mm | 1.50 in |
| Second Chamber Conduit 14: | | |
| Dimension E | 264 mm | 10.39 in. |
| Dimension F | 175 mm | 6.89 in |
| Dimension G | 50 mm | 1.97 in |
| Dimension H | 7 mm | 0.28 in |
| Dimension I | 168 mm | 6.61 in |
| Diameter of Bleed Holes 54 | 1.42 mm | 056 in |
| Material of Hoses 28 and 34 | DF 3907 | |
| Material of Tuning Tubes 42 and 50 | 3/8 inch O.D.Teflon tubing | |

It has been found that the use of tuning tube 42 in the first chamber conduit 12, being made of polymeric material without an aperture in the tube for fluid bleed, functions or is operable to focus noise attenuation at specific frequencies. This is in contrast to both steel wound and apertured Teflon tubes that use fluid bleed-through from the tuning tube to aid in broadening noise attenuation. Thus, the elimination of the bleed hole in the first chamber tuning tube 42 provides greater attenuation of pressure ripple, and also reduces component manufacturing costs.

In the second chamber conduit 14, the mounting of tuning tube 50, having its inlet end 60 spaced from inlet fitting 26 and facing in the direction of the fluid feed from the power steering pump 20, improves attenuation in the second tuning chamber 14 by using the damping characteristic of the second chamber hose material 34 in conjunction with the side branch tuning effect of apertured polymeric tuning tube 50.

In order to evaluate the performance of the noise reduction capability of power steering system 10 of the invention, the same was compared to a prior production system of substantially identical construction except for a conventional assembly of a tuning tube in the second chamber having its inlet end coupled to the inlet fitting 26 and its outlet opening into the interior chamber of hose 34 and spaced 10 mm from the entrance to outlet fitting 36. This production test control comparison system set-up also had a pair of diametrically opposite bleed holes (of the same dimension as bleed holes 54 set forth above) located in the first chamber tube at 50 mm from the interior end of inlet fitting 16. The tuning tube in the second chamber of this comparison system also had the bleed holes 54 located 50 mm from the coupling of the inlet end of this second chamber tuning tube from the downstream or outlet end of inlet fitting 26. All other dimensions and material parameters were the same as in the above-specified invention system 10. Both systems were tested in a Chrysler RS Mini-van model year 2003 to perform NVH evaluations related to power steering "moan" and steering "grunt". Interior sound pressure level measurements were acquired during specific vehicle operating conditions, which were at engine idle speed with and without steering effort applied. The vehicle was also subjectively evaluated for steering "grunt" and "shudder". The results of the objective interior SPL measurements showed improvement in the power steering $10^{th}$ and $20^{th}$ order moan levels.

By subjective evaluation, the baseline test vehicle did not exhibit "shudder" or "grunt". The evaluation of the test vehicle with the invention noise attenuation power steering system 10 showed no deterioration in the NVH performance level relative to "shudder" or "grunt".

The conclusions developed from this testing were that the system 10 of the invention had lower "moan" levels than the aforementioned comparison pressure hose noise attenuation system, with no deterioration in "grunt" and "shudder" performance. Both the comparison pressure hose assembly and the invention pressure hose assembly are considered to be acceptable for production.

Thus, the aforementioned testing evaluation demonstrates that the improved sound attenuation system 10 of the invention represents an improvement both from the stand point of reduced manufacturing costs as well as improved performance in reducing power steering $10^{th}$ and $20^{th}$ order moan levels.

Second Embodiment

Figure 5:
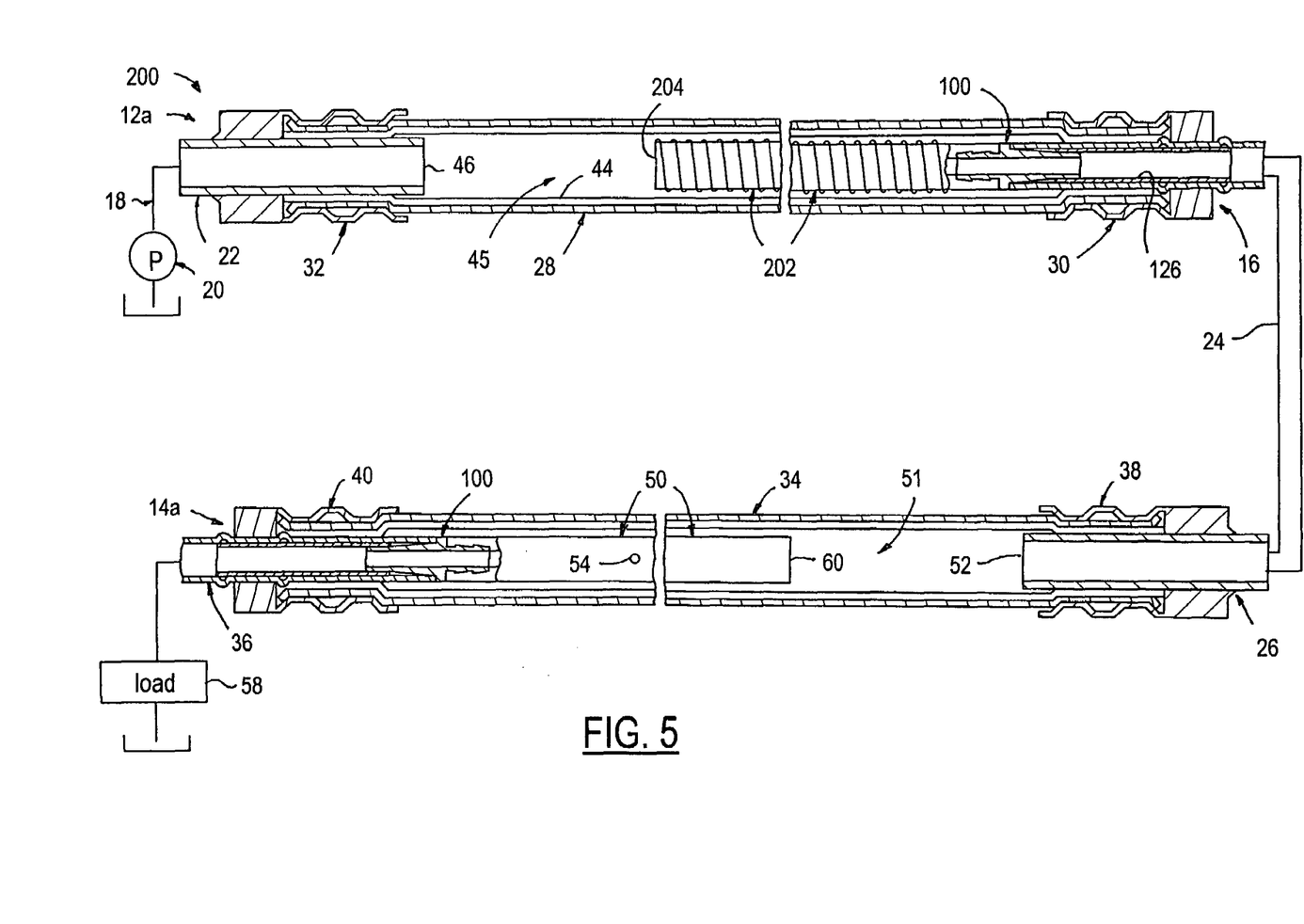
FIGS. 5, 6, 7, 8, 9, 10 and 11 are partially schematic and fragmentary views, partially in longitudinal center section, illustrating respectively second, third, fourth, fifth, sixth, seventh and eighth embodiments of pressure ripple attenuator conduit systems for suppression of fluid-borne noise in accordance with the invention and also applied to a power steering system.

FIG. 5 illustrates a second embodiment system 200 of the invention wherein components identical to those described in the first embodiment of FIGS. 1-4 are given like reference numerals and their description not repeated. It will be seen that the principal difference between the first and second embodiment systems 10 and 200 resides in the construction of the fluid tuning chamber conduit 12a employed in system 200. Firstly, instead of having a hollow polymeric tuning tube 42 extending from the inlet fitting 16 into the first tuning chamber 45, chamber conduit 12a of system 200 has a tuner conduit 202 extending from the outlet of chamber 45 in an upstream direction therein and has an open inlet end 204 facing upstream in chamber 45 and stopping well short of the inlet end of chamber 45. Secondly, tuning tube 202 is constructed of spirally, (i.e., helically) wound steel ribbon material in a conventional manner instead of being made of smooth wall polymeric (e.g., Teflon) tubular material.

Tuning tube 202 is secured to the outlet of chamber conduit 12a by the components employed in the inlet fitting 16 of conduit 12 of first embodiment system 10. The inlet to chamber conduit 12a uses the components of the outlet fitting 22 of chamber conduit 12 of system 10.

The second chamber conduit 14a of system 200 is constructed the same as that in system 10. However, it is to be noted that the bleed openings extending radially through the wall of tuning tube 50 (only one of such holes 54 being shown in FIGS. 1 and 5) and located diametrically opposite one another (or if desired, longitudinally staggered relative to one another) are, again, optional features and may, if desired, be omitted, at least for certain applications, without significantly altering system performance.

Third Embodiment

Figure 6:
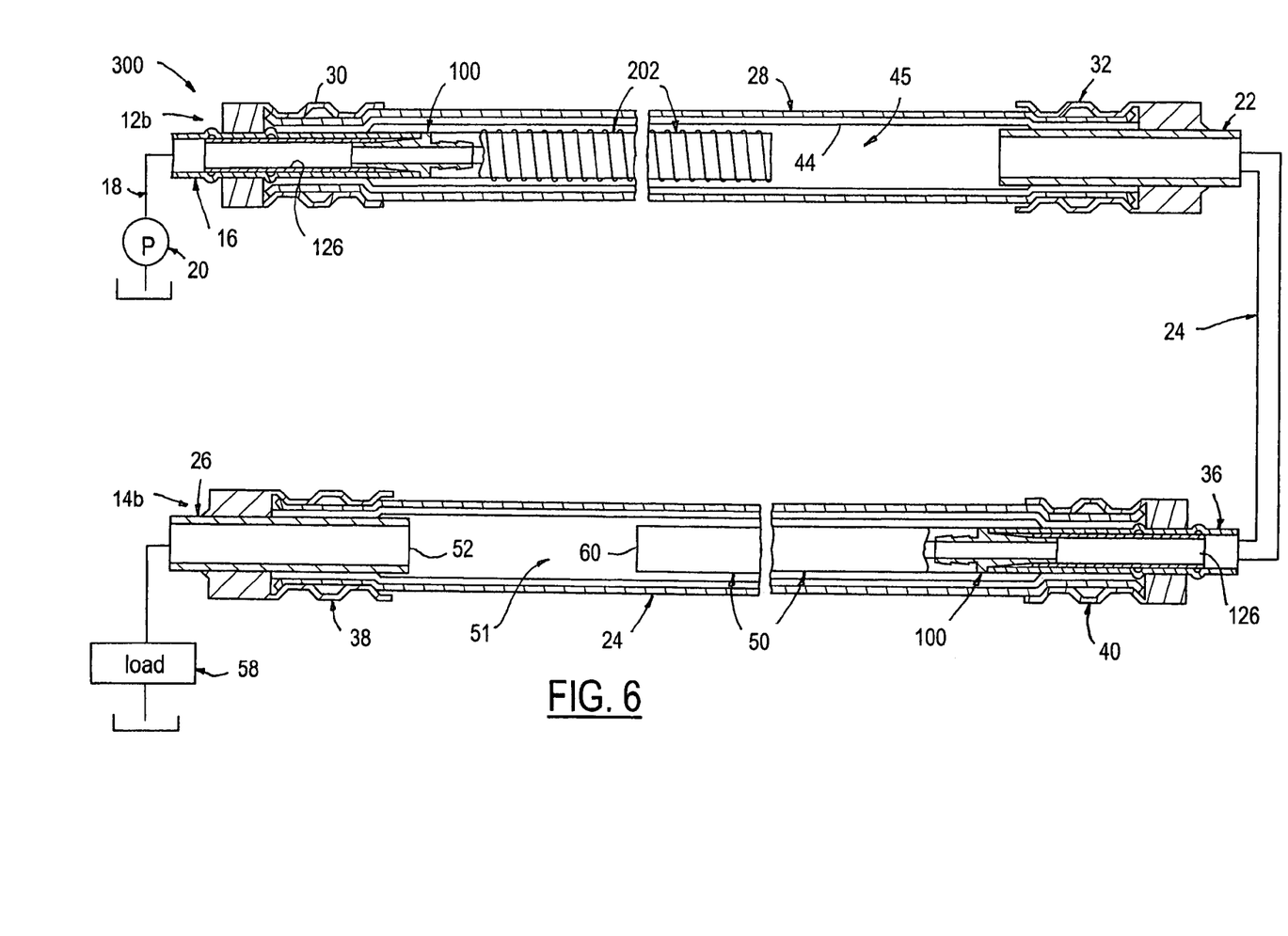

FIG. 6 illustrates a third embodiment 300 of a hydraulically actuated power steering system for a vehicle also in accordance with the present invention. Again, those components previously described in conjunction with systems 10 and 200 are given identical reference numerals and their description not repeated.

It will be seen by comparing FIGS. 5 and 6 that system 300 merely inverts 180° (figuratively speaking) the fluid tuning chamber 12a (end for end) so that spirally wound tuning cable 202 is attached to the inlet rather than the outlet end of chamber 12b and has its outlet end facing downstream and spaced from the outlet fitting 32 of chamber 12b. Likewise, in system 300 the second chamber conduit 14 system 200 of FIG. 5 is inverted 180° end for end to provide the second chamber conduit 14b of the system 300. Thus, as shown in FIG. 6, the polymeric tuning tube 50 now is attached by a fitting 100 to the inlet of chamber 14b, and has its outlet opening 60 facing downstream and spaced a suitable distance from the outlet of chamber 14b.

Fourth Embodiment

Figure 7:
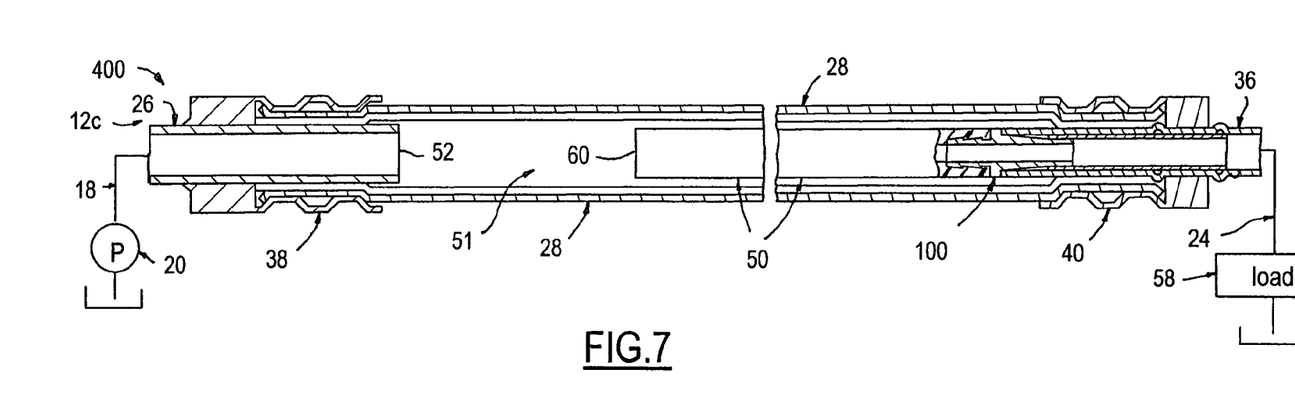

FIG. 7 illustrates a fourth embodiment system 400 of a hydraulically actuated power steering system for a vehicle also in accordance with the present invention. Again, in system 400 those components identical to the components previously described in conjunction with systems 10, 200 and 300 of FIGS. 1-6 are given like reference numerals and their description not repeated.

It will be seen that system 400 uses, for noise attenuation, just a single first chamber conduit 12c between pump 20 and load 58. Thus, chamber conduit 12c has its inlet directly coupled via conduit line 18 to pump 20 and its outlet directly coupled via conduit line 24 to load 58. Chamber conduit 12c of system 400 is constructed in a manner identical to chamber conduit 12b of system 300, but in this configuration the outlet fitting 38 of chamber 14b now is used as an inlet fitting by being coupled via conduit line 18 to pump 20. Similarly, the polymeric tuning tube 50 of chamber conduit 14b now serves in chamber conduit 12c as the outlet from interior chamber 51 and has its open end 60 facing upstream and spaced downstream of fitting 38 to receive fluid flow from interior chamber 51.

Fifth Embodiment

Figure 8:
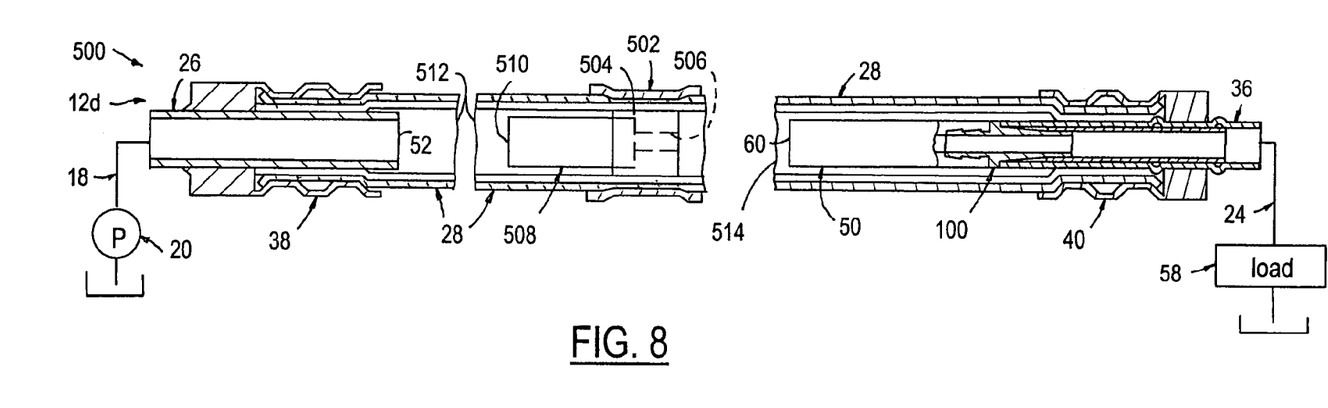

FIG. 8 illustrates a fifth embodiment system 500 of a hydraulically actuated power steering system for a vehicle also in accordance with the present invention. Again, in system 400 those components identical to the components previously described in conjunction with systems 10, 200, 300 and/or 400 of FIGS. 1-7 are given like reference numerals and their description not repeated.

It will be seen from FIG. 8 that system 500, like system 400, utilizes a single tuning chamber 12*d* having a similar inlet fitting 38 connected via conduit line 18 to pump 20, and having its outlet fitting 40 connected at its outlet end to load 58 via conduit line 24. The imperforate polymeric tuning tube 50 is again mounted at its downstream end to fitting 100 of outlet fitting 40. Tube 50 has its open upstream end 60 facing upstream of fluid flow-through chamber 12*d*.

Chamber conduit 12*d* differs from chamber conduit 12*c* of system 400 in having a conventional crimp collar restrictor subassembly 502 affixed exteriorly and interiorly in the usual manner to hose 28 at a suitable location therealong, e.g., generally the midpoint between the inlet opening 52 and outlet opening 60 in chamber 12*d*. The inner cylindrical restricting plug element 504 of restrictor subassembly 502 has the usual restricted through-passage 506 leading, in the upstream direction into a counterbore in which another imperforate polymeric tuning tube 508 is mounted. Tube 508 extends in an upstream direction to its open inlet end 510 that is spaced downstream from the outlet opening 52 of fitting 38. Restrictor subassembly 502 thus subdivides hose 28 into two interior tuning chambers, namely, an upstream chamber 512 and a downstream chamber 514. Inlet 510 of tube 508 thus opens into chamber 512, whereas inlet 60 of tube 50 opens into chamber 514.

Sixth Embodiment

Figure 9:
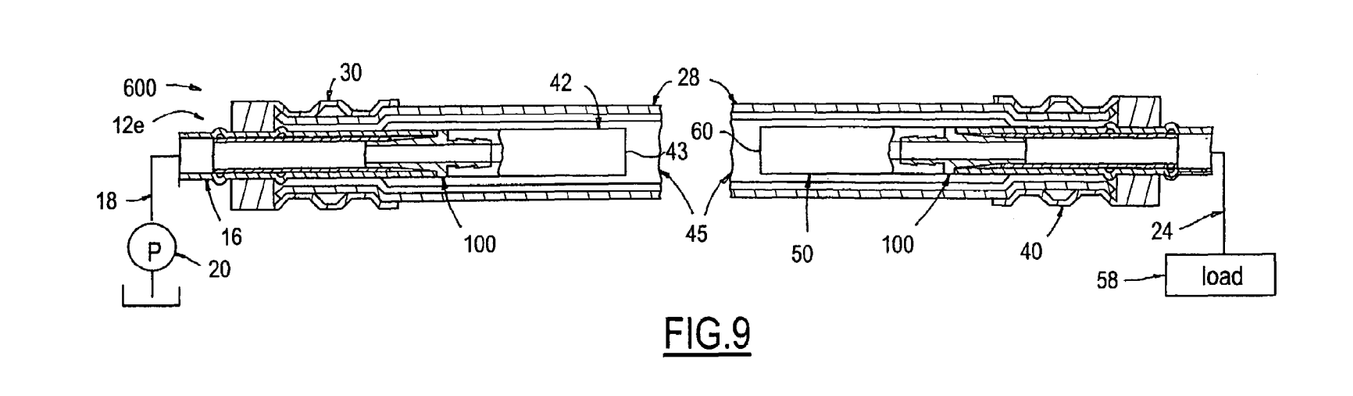

FIG. 9 illustrates a sixth embodiment system 600 of a hydraulically actuated power steering system for a vehicle also in accordance with the present invention. Again, in system 600 those components identical to the components previously described in conjunction with systems 10, 200, 300, 400 and/or 500 of FIGS. 1-8 are given like reference numerals and their description not repeated.

It will be seen that system 600, like that of systems 400 and 500, uses, for noise attenuation, just a single tuning chamber conduit 12*e* between pump 20 and load 58. Thus, chamber conduit 12*e* has its inlet fitting 16 directly coupled via conduit line 18 to pump 20 and its outlet fitting 40 directly coupled via conduit line 24 to load 58.

System 600 is characterized by having both an inlet tuning tube 42 and an outlet tuning tube 50 disposed in axially juxtaposed spaced apart relation in interior chamber 45. The outlet 43 of inlet tube 42 faces the inlet 60 of outlet tube 50 and the tuning tubes are in fluid communication with one another via the unrestricted interior chamber 45 of hose 28. Preferably chamber conduit 12*e* utilizes the inlet fitting 16 and inlet tuning tube 42 of system 10 at its upstream end, and utilizes at its downstream end the identical outlet construction, i.e., fitting 40 and tuning tube 50, of the chamber conduit 14 of system 10.

The operation and performance characteristics of system 600 differs from system embodiments 100-500, 700 and 800 in that this system 600 pressure hose and two tuning cable combination utilizes the full length of the hose energy absorbing capabilities along with the side branch attenuation of two tuners 42 and 50. This system results in a fairly broad band of attenuation because of the large gap between tuners 42 and 50. This type of broad band attenuation covers a wider band of attenuation even though the transmission loss is less as compared to a narrow band attenuator. This design provides an advantage where the pump speed varies considerably due to additional loading from the alternator (electrical), HVAC (ac compressor), and power steering loads. These additional loads can drastically affect engine and pump idle speeds. Although some vehicles have idle speed controllers to compensate for the additional loading, some vehicles do not.

Seventh Embodiment

Figure 10:
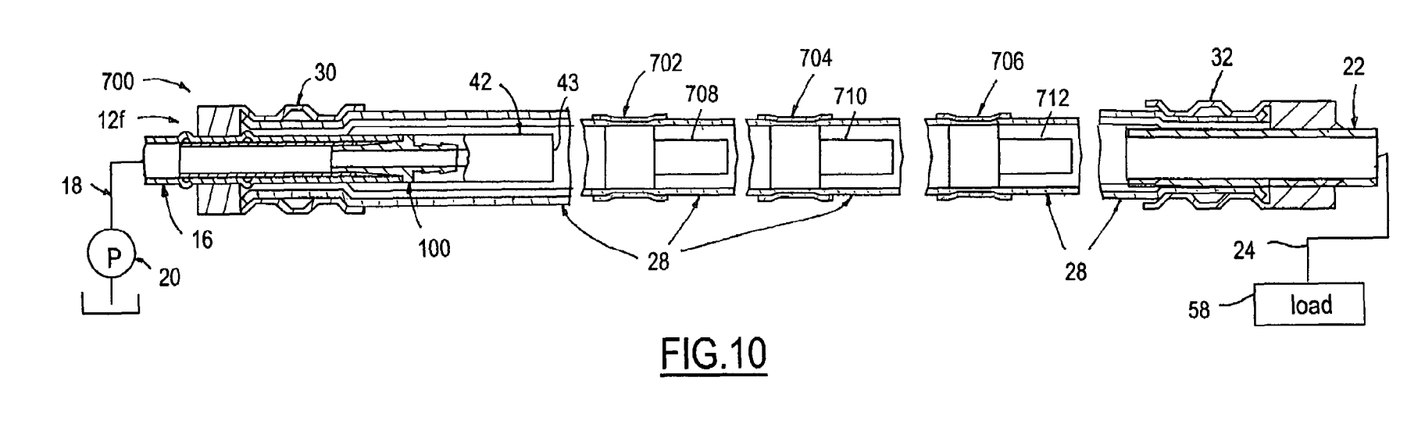

FIG. 10 illustrates a seventh embodiment system 700 of a hydraulically actuated power steering system for a vehicle also in accordance with the present invention. Again, in system 700 those components identical to the components previously described in conjunction with systems 10, 200, 300, 400, 500 and/or 600 of FIGS. 1-9 are given like reference numerals and their description not repeated.

It will be seen from FIG. 10 that system 700 uses, for noise attenuation, just a single tuning chamber conduit 12*f* which preferably uses all of the components of tuning chamber 12 of FIG. 1, but is made axially longer to accommodate three additional components mounted within hose 28 between the outlet 43 of tuning tube 42 and the inlet 46 of outlet tube 22. As shown semi-schematically in FIG. 10, these three additional components comprise three restrictor subassemblies 702, 704 and 706 constructed similar to restrictor subassembly 502 of system 500. Each of these restrictor subassemblies 702, 704 and 706 has an associated imperforate polymeric tuning tube 708, 710 and 712 respectively mounted at its upstream end within an outlet counterbore of the associated restrictor plug element of each restrictor subassembly and having an open outlet end facing downstream. It will be understood that, for convenience, the scale of the hose 28 housing the restrictor subassemblies 702, 704 and 706 in FIG. 10 is shown on a reduced scale relative to the remaining components illustrated in FIG. 10, it being understood that hose 28 has a constant outside diameter and inside diameter throughout its entire axial length between fittings 30 and 32.

Eighth Embodiment

Figure 11:
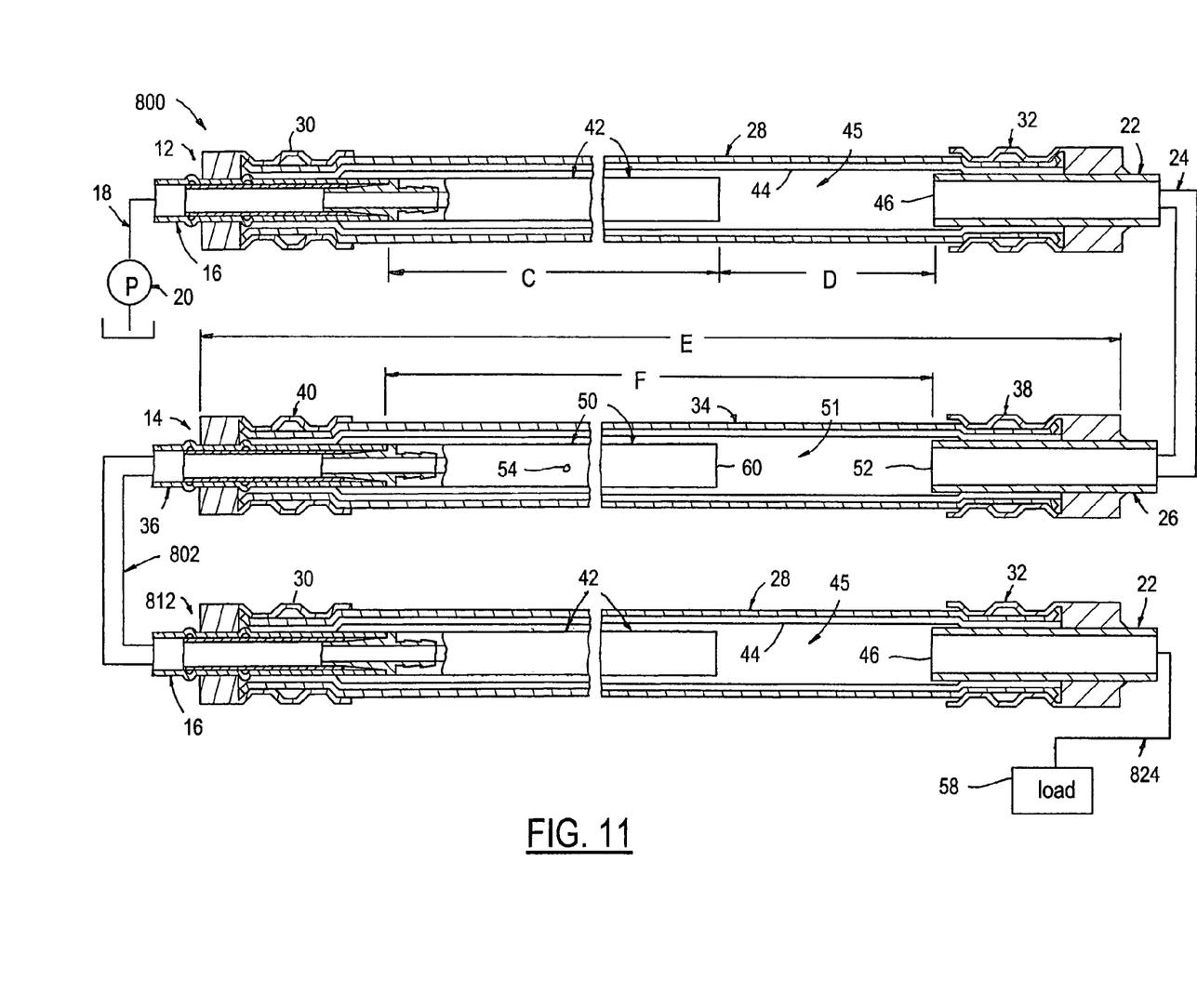

FIG. 11 illustrates an eighth embodiment system 800 of a hydraulically actuated power steering system for a vehicle also in accordance with the present invention. Again, in system 800 those components identical to the components previously described in conjunction with systems 10, 200, 300, 400, 500 600, and 700 of FIGS. 1-10 are given like reference numerals and their description not repeated.

It will be seen that system 800, like that of system 10, uses the serially coupled tuning chamber conduits 12 and 14, with the output of pump 20 communicating via line 18 with the inlet 16 of chamber 12 and with the outlet of chamber 12 coupled by line 24 to the inlet 26 of chamber 14. However, instead of coupling the output of chamber 14 directly to the load 58, the outlet tube 36 is coupled via a tubular line 802 to the inlet of a third tuning chamber conduit 812 which is preferably identical in construction to chamber 12. The outlet 22 of chamber 812 is then coupled via an output tubular conduit 824 to the load 58.

It is to be understood that in systems 100-500, 700 and 800 each chamber (hose and tuner section) has a very specific attenuation characteristic. The chamber/tuners with no bleed, either by hole or cable winding, provide a high narrow band of fluid borne noise attenuation, even though the amount of attenuation is lower. When these two chambers, operable as specific noise filters, are placed in series, with any combination of filters, they thereby incorporate a given broad band attenuation with a specific narrow band frequency. The narrow band frequency is tuned for a specific pressure order of a pump. The lengths of each chamber/tuner will be dependent on the pump pressure pulsation frequencies.

Thus all of the noise attenuation hose designs of systems 100-500, 700 and 800 incorporate a broad and narrow band fluid borne noise filter.

Although the illustrated embodiments have been discussed in conjunction with conventional hydraulic power-assist vehicle steering systems commonly employed in automotive vehicles of current manufacture, the invention is by no means limited to such applications. Modifications and variations will readily suggest themselves to persons of ordinary skill in the art. The invention is therefore intended to embrace all such modifications and variations as fall within the spirit and broad scope of the appended claims.

The invention claimed is:

1. An energy attenuation apparatus for a system conveying liquid under pressure, wherein said apparatus is disposed in a liquid conveying structure of said system, said apparatus comprising the following components:
   (a) first and second outer expansible hose conduits, each of which respectively defines an associated first and second tuning chamber having an inlet end and an outlet end,
   (b) a generally non-expansible tubular conduit directly interconnecting said two hose conduits, wherein said chambers communicate with one another via said tubular conduit,
   (c) a first tuning tube of polymeric material disposed in said first chamber and having a first end connected to said inlet end of said first chamber for receiving liquid therein and having a second open end that is spaced from said outlet end of said first chamber for emptying liquid into said first chamber, said first tuning tube being the only tuning tube disposed in said first chamber, and
   (d) a second tuning tube of polymeric material disposed in said second chamber and having a first end connected to said outlet of said second chamber for conveying liquid thereto and a second open end that is spaced from said inlet end of said second chamber for receiving liquid conveyed to said second chamber via said tubular conduit, said second tuning tube being the only tuning tube disposed in said second chamber.

2. An energy attenuating apparatus of claim 1 wherein said second tuning tube is apertured in its sidewall to communicate with an annular space defined between said second tuning tube and the interior of said outer hose of said second chamber.

3. The apparatus of claim 2 wherein said first tuning tube has an imperforate sidewall.

4. The apparatus of claim 3 wherein said second tuning tube is apertured by having two diametrically opposite bleed holes in its sidewall communicating the interior of said second tuning tube with said annular space.

5. The apparatus set forth in claim 4 wherein the overall longitudinal axial length of said first chamber assembly is in the order of about 425 mm, whereas the corresponding dimension of the second chamber is in the order of about 264 mm.

6. An energy attenuation apparatus for a system conveying liquid under pressure, wherein said apparatus is disposed in a liquid conveying conduit structure of said system, said apparatus comprising:
   (a) first and second tuning conduits each including an associated outer volumetrically compliant expansible hose, each said hose defining a tuning chamber having an inlet end and an outlet end,
   (b) a generally non-expansible metal tubing directly interconnecting said two outer hoses such that said tuning chambers communicate with one another via said tubing,
   (c) a first tuning tube disposed in said tuning chamber of said first conduit and having a first end connected to the inlet end of said first conduit chamber for receiving liquid from said system, and a second open end that is spaced from said outlet end of said first conduit chamber for conveying said liquid thereto, said first tuning tube being the only tuning tube disposed in said first chamber, and
   (d) a second tuning tube disposed in said tuning chamber of said second conduit and having a first end connected to said outlet of said second conduit chamber for conveying liquid thereto and a second open end that is spaced from the inlet end of said second conduit chamber for receiving liquid conveyed into said second conduit chamber via said tubing, said second tuning tube being the only tuning tube disposed in said second chamber.

7. The apparatus of claim 6 wherein the material of said tuning tubes comprises a polymeric material.

8. The apparatus of claim 7 wherein a power steering pump is coupled to said inlet end of said first tuning conduit and a power steering gear load is coupled to said outlet end of said second tuning conduit.

9. A method for energy attenuation using specially arranged apparatus in a system conveying liquid under pressure, wherein said apparatus is constructed and arranged in a liquid conveying structure of said system, said method comprising the following steps:
   (a) providing first and second outer expansible hose conduits, each of which respectively defines an associated first and second tuning chamber having an inlet end and an outlet end,
   (b) providing a generally non-expansible tubular conduit directly interconnecting said two hose conduits, wherein said chambers communicate with one another via said tubular conduit,
   (c) providing a first tuning tube of polymeric material disposed in said first chamber and having a first end connected to said inlet end of said first chamber for receiving liquid therein and having a second open end that is spaced from said outlet end of said first chamber for emptying liquid into said first chamber, said first tuning tube being the only tuning tube disposed in said first chamber, and
   (d) providing a second tuning tube of polymeric material and mounting it in said second chamber such that a first end of said second tuning tube is connected to said outlet of said second chamber for conveying liquid thereto and a second open end of said second tuning tube is spaced from said inlet end of said second chamber for receiving liquid conveyed to said second chamber via said tubular conduit, said second tuning tube being the only tuning tube disposed in said second chamber.

10. The method of claim 9 wherein said second tuning tube is apertured in its sidewall to communicate with an annular space defined between said second tuning tube and the interior of said outer hose of said second chamber.

11. The method of claim 10 wherein said first tuning tube has an imperforate sidewall.

12. The method of claim 11 wherein said second tuning tube is apertured by having two diametrically opposite bleed holes in its sidewall communicating the interior of said second tuning tube with said annular space.

13. The method of claim 12 wherein the overall longitudinal axial length of said first chamber assembly is in the order of about 425 mm, whereas the corresponding dimension of the second chamber is in the order of about 264 mm.

14. The method of claim 9 wherein the first and second conduits each include an associated outer volumetrically compliant expansible hose, each said hose defining the associated tuning chamber having said inlet end and an outlet end, and wherein said tubular conduit comprises a generally non-expansible metal tubing interconnecting said two outer hoses such that said tuning chambers communicate with one another via said tubing.

15. The method of claim 14 wherein the material of said tuning tubes comprises a polymeric material.

16. An energy attenuation apparatus for a system conveying liquid under pressure wherein said apparatus is disposed in a liquid conveying conduit structure of said system, said apparatus comprising:
(a) first and second tuning conduits each including an associated outer volumetrically compliant expansible hose, each said hose defining a tuning chamber having an inlet end and an outlet end,
(b) a generally non-expansible metal tubing directly interconnecting said two outer hoses such that said tuning chambers communicate with one another via said tubing,
(c) a first tuning tube disposed in said tuning chamber of said first conduit and having a first end connected to the outlet end of said first conduit chamber for conveying said liquid therefrom, and a second open end that is spaced from said outlet end of said first conduit chamber for receiving liquid from said system, said first tuning tube being the only tuning tube disposed in said first chamber, and
(d) a second tuning tube disposed in said tuning chamber of said second conduit and having a first end connected to said outlet of said second conduit chamber for conveying liquid thereto and a second open end that is spaced from the inlet end of said second conduit chamber for receiving liquid conveyed into said second conduit chamber via said tubing, said second tuning tube being the only tuning tube disposed in said second chamber, and wherein the material of said first tuning tube comprises helically wound steel ribbon.

17. The apparatus of claim 16 wherein a power steering pump is coupled to said inlet end of said first tuning conduit and a power steering gear load is coupled to said outlet end of said second tuning conduit.

18. An energy attenuation apparatus for a system conveying liquid under pressure, wherein said apparatus is disposed in a liquid conveying conduit structure of said system, said apparatus comprising:
(a) first, second and third tuning conduits each including an associated outer volumetrically compliant expansible hose, each said hose defining a tuning chamber having an inlet end and an outlet end,
(b) generally non-expansible first and second metal tubing connector conduits respectively serially interconnecting said outer hoses of said tuning conduits such that said tuning chambers of said first, second and third tuning conduits serially communicate with one another via said tubing,
(c) a first tuning tube disposed in said tuning chamber of said first conduit and having a first end connected to the inlet end of said first conduit chamber for receiving liquid from said system, and a second open end that is spaced from said outlet end of said first conduit chamber for conveying said liquid thereto, said first tuning tube being the only tuning tube disposed in said first chamber,
(d) a second tuning tube disposed in said tuning chamber of said second tuning conduit and having a first end connected to said outlet of said second conduit chamber for conveying liquid thereto and a second open end that is spaced from the inlet end of said second conduit chamber for receiving liquid conveyed into said second conduit chamber via said tubing, said second tuning tube being the only tuning tube disposed in said second chamber, and
(e) a third tuning tube disposed in said tuning chamber of said third conduit and having a first end connected to the inlet end of said third conduit chamber for receiving liquid from said second tubing connector conduit, and an open second end that is spaced from said outlet end of said third conduit chamber for conveying said liquid thereto.

19. The apparatus of claim 18 wherein the material of said tuning tubes comprises a polymeric material.

20. The apparatus of claim 18 wherein a power steering pump is coupled to said inlet end of said first tuning conduit and a power steering gear load is coupled to said outlet end of said third tuning conduit.

* * * * *